H. A. MARTIN.
COIN REGISTERING MECHANISM.
APPLICATION FILED MAY 15, 1916.

1,329,540.

Patented Feb. 3, 1920.
7 SHEETS—SHEET 1.

Inventor
Haakon A. Martin
Attorneys

Inventor
Haakon A. Martin

H. A. MARTIN.
COIN REGISTERING MECHANISM.
APPLICATION FILED MAY 15, 1916.

1,329,540.

Patented Feb. 3, 1920.
7 SHEETS—SHEET 5.

Inventor
Haakon A. Martin
Attorneys

H. A. MARTIN.
COIN REGISTERING MECHANISM
APPLICATION FILED MAY 15, 1916.
1,329,540.
Patented Feb. 3, 1920.
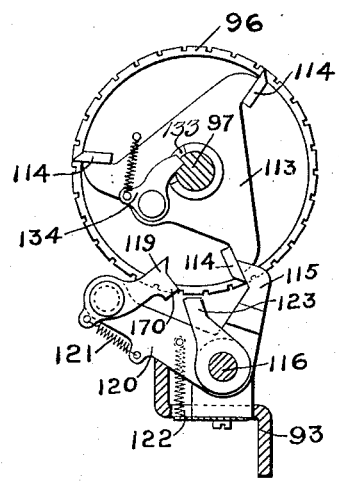
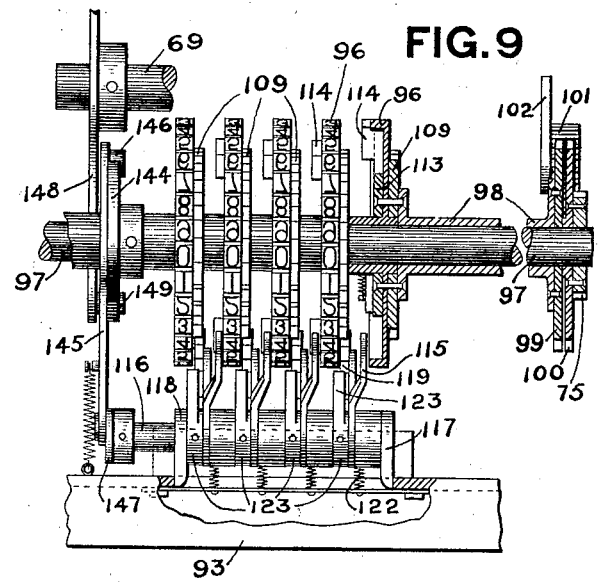
Inventor
Haakon A. Martin
Attorneys

UNITED STATES PATENT OFFICE.

HAAKON A. MARTIN, OF DAYTON, OHIO, ASSIGNOR TO THE NATIONAL CASH REGISTER COMPANY, OF DAYTON, OHIO.

COIN-REGISTERING MECHANISM.

1,329,540.   Specification of Letters Patent.   Patented Feb. 3, 1920.

Application filed May 15, 1916. Serial No. 97,571.

*To all whom it may concern:*

Be it known that I, HAAKON A. MARTIN, a citizen of the United States, residing at Dayton, in the county of Montgomery and State of Ohio, have invented certain new and useful Improvements in Coin-Registering Mechanism, of which I declare the following to be a full, clear, and exact description.

This invention relates to registering coin boxes.

The main object of this invention is to provide a machine which will eliminate the cost of issuing tickets which are subsequently received for admission to places, such as elevated railroads, subways, amusement parks, moving picture theaters and the like, as well as on street cars using the pay-as-you-enter system.

It is evident that such a machine will effect a considerable saving, when used in places of amusement and the like, to the proprietors of such places as it will eliminate not only the cost of the tickets but also will make it unnecessary to have more than one attendant, to insure that the price of admission is deposited in the machine. A system which uses tickets requires the services of at least two attendants, one to sell the tickets and one to collect them at the entrance. In a system embodying the present invention the only duty of the attendant would be to see that coins of the proper denomination are placed in the receptacle and that no spurious coins are deposited.

It is also an object of this invention to provide means whereby the coins deposited need not be registered at once but may be held until a convenient opportunity arises. This feature is very useful during rush periods, at which time the attention of the attendant should be concentrated on the coins being deposited. After the rush has subsided he may operate the machine to register the values of the coins deposited.

Another object of the invention is to provide means for printing the total amount of the inserted coins registered by the machine, during any desired period of time, upon an inserted card.

With these and incidental objects in view, the invention consists in certain novel features of construction and combinations of parts, the essential elements of which are set forth in the appended claims, and a preferred form of embodiment of which is hereinafter described with reference to the drawings which accompany and form part of the specification.

Of said drawings:—

Fig. 9 is a detail view of the totalizing mechanism showing the transfer pawls therefor.

Fig. 10 shows one of the totalizer wheels and the transfer tripping mechanism and transfer pawls.

Fig. 11 is a detail view of the cam and connections for operating the coin slide.

Fig. 12 is a detail view of the cam and pitman for operating the coin plunger.

Fig. 13 is a detail of the cam and pitman which actuates the mechanism for adding the value of the coin on the totalizer.

Described in general terms the machine comprises a cylindrical coin receptacle the side walls of which are of glass or other transparent material. In order that coins deposited therein cannot be removed, the top member is funnel-shaped with an opening in the center through which the coins fall onto a platform beneath. The opening, however, is not large enough to permit the insertion of the operator's hand to remove any coins deposited. This platform is formed in halves adapted to be manually rocked to allow the coins to slide therefrom and into a tube below the coin receptacle. The coins may remain in this tube until it is filled or until such time as it is desired to register them.

The machine of the present embodiment is provided with an operating handle but it is evident that any suitable driving mechanism may be used. When this handle is rotated with coins in the coin tube, a slide will pass laterally across the bottom of the coin tube and will come into engagement with the periphery of the bottom coin in the tube and will push this coin ahead of it.

As the coin is ejected from the bottom of the coin tube it comes into engagement with a roller mounted in a pivoted frame. This frame is rocked about its pivot to different extents by the engagement of the roller with the ejected coin and positions an arm, carried thereby, in alinement with one of a series of arms, which correspond to the denominations of the coins which the machine is adapted to handle. Then when the machine is operated further the movement of these arms will cause the amount represented by the arm selected for operation to be added on the totalizer, as will be fully described later. After the coin positions the roller, above mentioned, it is moved beyond the roller by the coin slide and falls into a locked compartment.

The totalizer elements also act as printing wheels. The machine is adapted to print the amount standing on the totalizer wheels on an inserted card at any desired time. There is a chute provided where a card can be inserted and a manually operated printing hammer is provided, when operated, to press the card against the totalizer wheels and the card thereby receiving an impression from the same through an inking ribbon.

Figure 1:
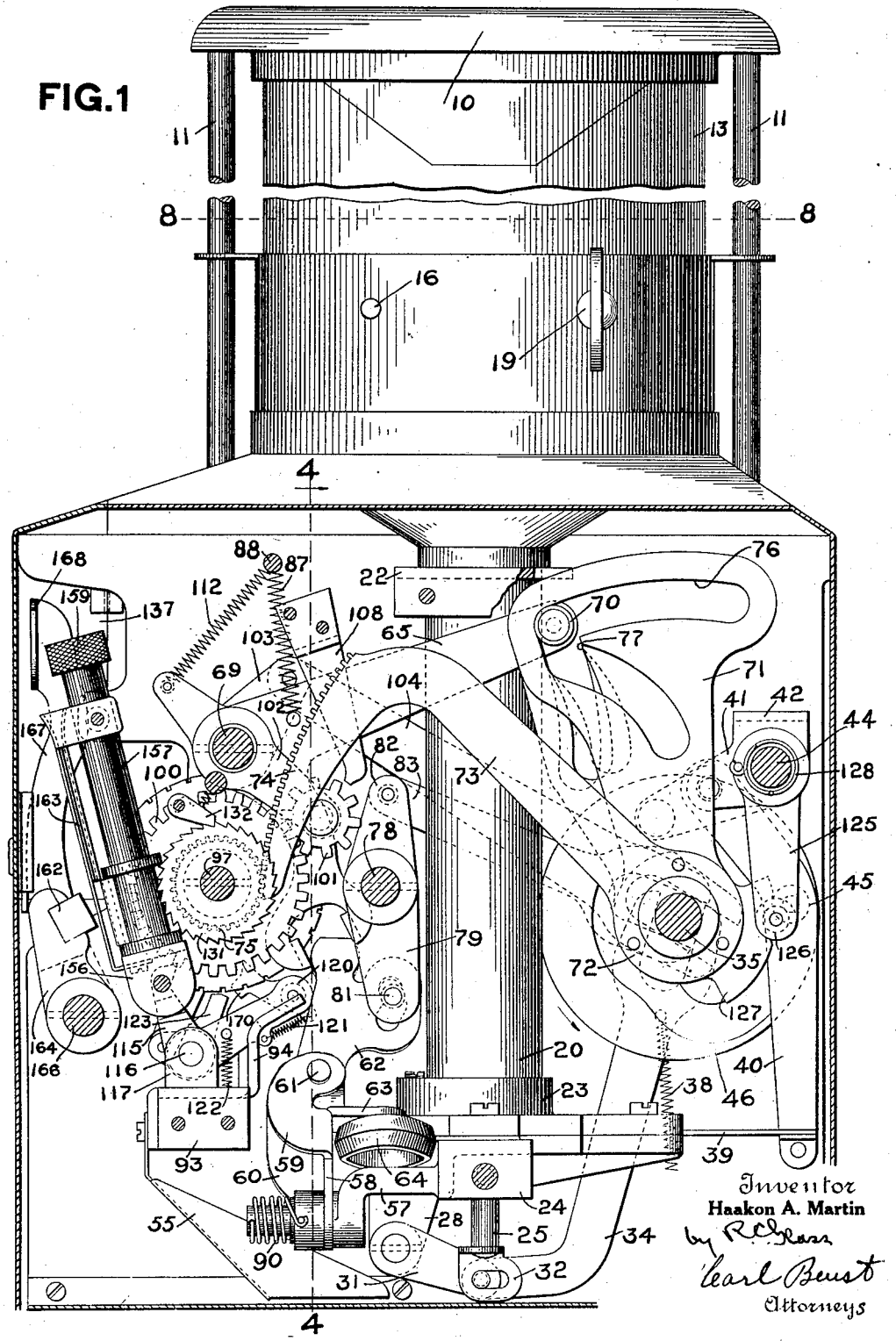
Figure 1 is a transverse sectional view taken through the machine on the line 1—1 of Fig. 3.
Figure 2:
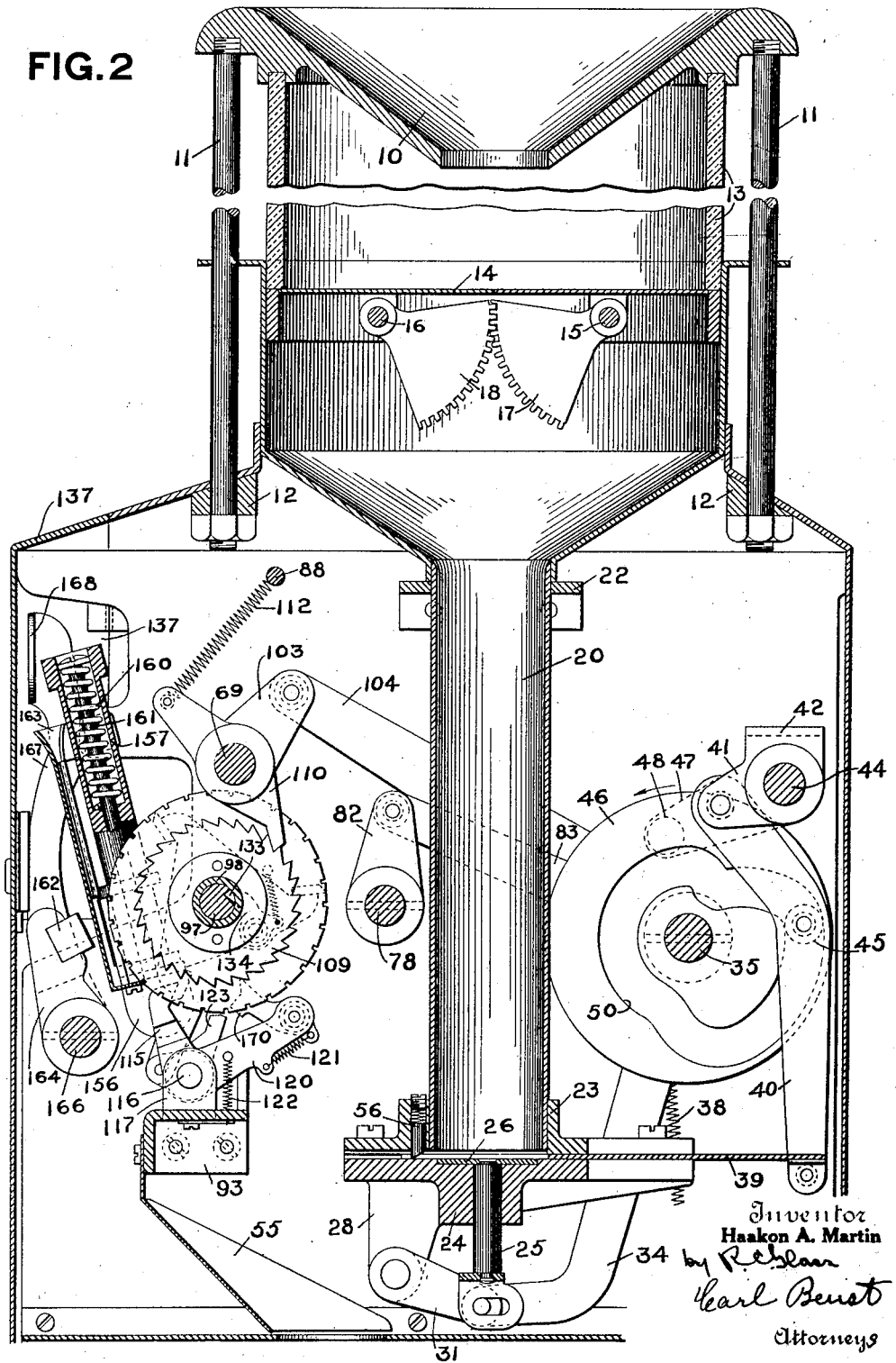
Fig. 2 is a transverse vertical section through the machine taken on the line 2—2 of Fig. 3.
Figure 8:
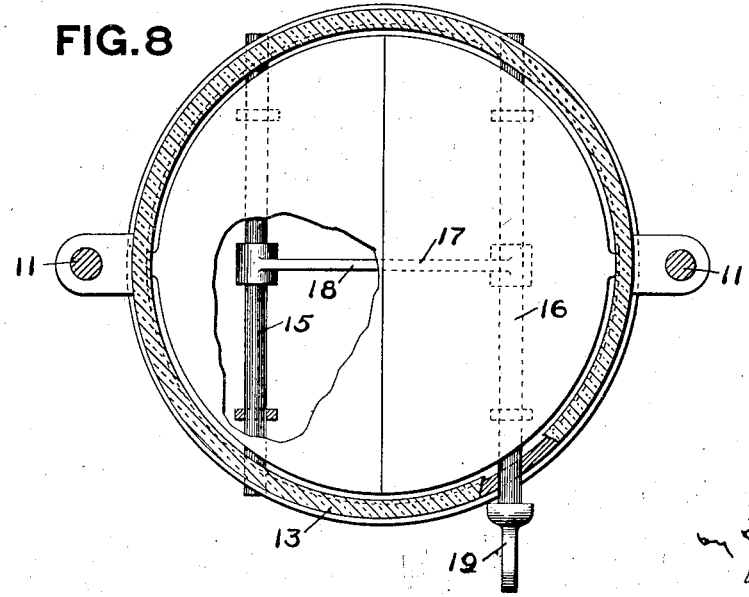
Fig. 8 is a horizontal section of the coin receptacle taken on the line 8—8 of Fig. 1.

The top member 10 (Figs. 1 and 2) of the coin receptacle is held by bolts 11, which pass through cross bars 12 of the machine frame. The coin receptacle is cylindrical in shape the side walls 13 being of glass or some other transparent material (Figs. 1, 2 and 8). At the bottom of the coin receptacle is a platform 14 which is formed in halves, fast on the shafts 15 and 16. The shafts 15 and 16 also carry segment gears 17 and 18 which mesh one with the other. Fast on the end of shaft 15 (Fig. 1) is a thumb lever 19. When this thumb lever is operated it can be seen that, through the action of the segment gears 17 and 18, the halves of the platform 14 will be rocked with their shafts 15 and 16 respectively, in order that any coins which may have been deposited in the coin receptacle will slide from the platform 14 and into the coin tube 20.

The coin tube 20 is cylindrical in shape, the diameter of said tube being slightly larger than the diameter of the largest coin to be registered by the machine. It is supported at the top in a cross bar 22, extending laterally of the machine. At its lower end the coin tube is mounted in a collar forming part of a casting 23 fast to a cross bar 24 of the machine frame.

Figure 4:
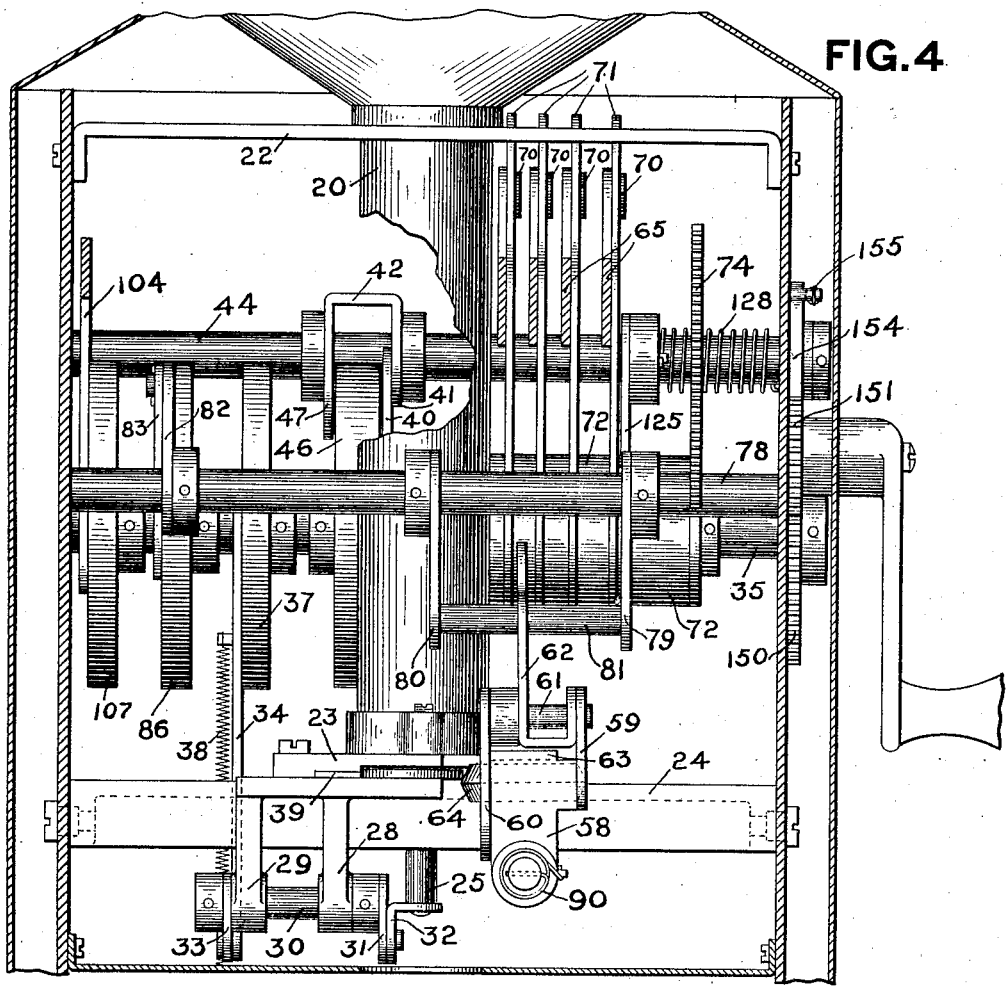
Fig. 4 is a transverse section taken on line 4—4 of Fig. 1.

In case the coins when they fall into the coin tube do not lie flat in the tube the following mechanism is provided to cause them to assume a horizontal position. Mounted in the cross bar 24, is a plunger 25 (Fig. 2) which carries at its upper end a disk 26. This disk is adapted to lie in a recess in the cross bar 24, the top of the disk being flush with the top of the cross bar on which the coins in the tube 20 stand (Fig. 4). The cross bar 24 has two depending arms 28 and 29. These arms form the bearings for a short shaft 30 carrying an arm 31 connected to an L shaped member 32 by a slot and pin connection, as shown in Figs. 1, 2 and 4, the other end of this L shaped member being fast to the bottom of the plunger 25. Fast on the other end of the short shaft 30 is an arm 33 similar to the arm 31 and pivotally connected to the lower end of a pitman 34 (Figs. 1, 2 and 12). As shown in Fig. 12 this pitman 34 is bifurcated at its upper end and straddles the main driving shaft 35 of the machine. The pitman 34 carries a roller 36, which moves in the race of a box cam 37, fast on the shaft 35. It can be seen from the conformation of the race in the cam disk 37 that at the very beginning of each operation of the machine the pitman 34 is quickly raised and then quickly lowered to its normal position, which position it occupies during the remainder of the operation of the machine.

It is therefore evident that as the pitman 34 is raised at the beginning of each operation of the machine, the plunger 25 will also be raised through the connections, above described. This movement of the plunger is for the purpose of "shaking" the coins in the coin tube in order to cause any coins which are not in horizontal position to assume such a position. The cam race in the disk 37 provides a positive return for the pitman 34 but in order to aid in the return of the pitman and thereby the plunger 25 to their normal positions, in the shortest possible time, a spring 38 is provided.

It is necessary in the operation of this machine that the coins be ejected singly from the coin tube and the description of the mechanism provided to accomplish this function follows. Below the coin tube the cross bar 24 forms a table. This table supports the coins in the coin tube, the table being a sufficient distance from the bottom of the coin tube that the bottom coin in the tube may be slid on the table and clear the bottom of said coin tube. The mechanism for sliding the bottom coin from the coin tube 20 comprises a flat sliding ejecting member 39, which slides in an opening between the lower supporting frame 23 for the coin tube 20 and the cross bar 24. As shown in Fig. 2 the sliding member, at its right hand end, is pivotally connected to a lever 40. This lever 40 at its upper end is pivoted to an arm 41 of a yoke frame 42. This yoke frame, as shown in Figs. 2 and 4, is loosely mounted on a shaft 44. The lever 40 about midway of its length carries a roller 45 engaging in the race of a cam disk 46. Another arm 47 of the yoke frame 42 carries a roller 48 at its extreme end. This roller engages in a race 53 (Fig. 11) cut in the opposite side of the cam disk 46 from that in which the roller 45 on the lever 40 engages. It is evident that as the lever 40 is pivoted to the sliding member 39 this lever will have to maintain a position normal to the sliding member 39 during the entire movement of the same. To accomplish this, it can be seen that when the cam groove 50, in the disk 46, causes the lever 40 to move to the left, as seen in Fig. 2, the upper end of the lever 40, which is pivoted to the arm 41 of the yoke frame 42, will have to be raised (Fig. 2) in order to allow the member 39 to move in a straight line. The configuration of the cam groove 53 is such that as the cam groove 50 moves the lower end of lever 40 to the left (Fig. 2) the cam groove 53 will rock the arm 47 counter-clockwise (Fig. 11) and thereby rock the arm 41 of the yoke frame 42 clockwise (Fig. 2). Thus it can be seen that as the lever 40 moves the sliding member 39 to the left, as seen in Fig. 2, the upper end of the lever 40, which is pivoted to the arm 41, will be moved upward a distance sufficient to compensate for the tendency of the pivotal connection of this lever 40 with the sliding member 39 to move in an arc. In this manner the slide 39 is moved in a true horizontal plane in all of its movements. The configuration of the cam groove 50 causes the sliding member to move in the following described manner: At the beginning of each operation of the machine the sliding member 39 is moved across the table 27 and engages the lowest coin in the coin tube 20 and pushes this coin ahead of it to a position in which the coin will set the differential mechanism in a manner which will be fully described later. The coin remains in this position until the actuating mechanism has been operated after which the sliding member 39 is given a slight further movement in the direction of its first movement to move the coin out of operative relation with the differential mechanism. The coin when moved from said operative relation with the differential mechanism will fall from the table 27 and by means of an inclined chute 55, fast to a cross bar 93 of the machine frame will be directed into a compartment 21 in the bottom of the machine, which may be locked if desired. The sliding member is then returned to normal position. Mounted in the lower supporting frame 23 for the coin tube is a spring pressed plunger pin 56 (Fig. 2). As can be seen in this figure this pin 56, which is beveled at its lower end, will be elevated by the pressure of the ejected coin against its inclined surface. It is apparent that this plunger pin 56 will allow only one coin at a time to be ejected from the coin tube 20, and will also hold this coin in a horizontal position on the cross bar 24 during the time required to set the differential mechanism.

Extending forwardly from the cross bar 24 of the machine frame is an arm 57 carrying a bearing stud for a rock frame 58. This rock frame consists of a plate bent to form side members 59 and 60 for the same. At their upper ends these side members carry a rod 61, and loosely mounted on this rod 61 between the side members 59 and 60 is a U shaped member 62, one arm of which is longer than the other (Fig. 4). The rock frame 58 has a rearwardly extending projection 63 from which is suspended a roller 64. The rock frame 58 carries the roller 64 in a position (Fig. 4) in which the periphery of a coin ejected from the coin tube 20 will engage the periphery of the roller 64 and thereby rock the rock frame different distances from its normal position (shown in Fig. 3), depending on the denomination of the coin ejected from the coin tube 20. There is a coiled spring 90 provided which is coiled about the stud on the arm 57 which tends to force the rock frame 58 counter-clockwise (Fig. 4). This spring 90 returns the rock frame 58 to normal position after each operation of the machine.

Figure 5:
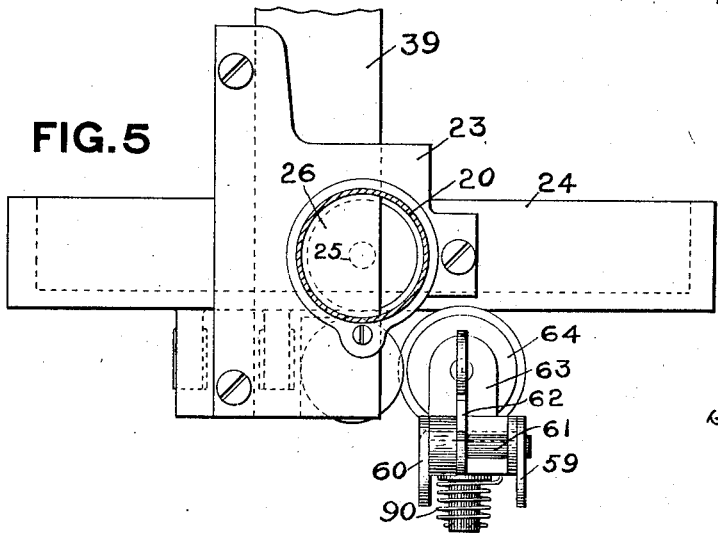
Fig. 5 is a plan view showing the coin tube, in section, coin slide and part of the differential mechanism in the positions they occupy when a coin has been ejected from the coin tube.

As can be seen in Fig. 4 the lower side of the supporting frame 23 is cut away to form an opening through which the coin, ejected from the coin tube, is pushed by the ejecting member 39. The coin as it is pushed into this cut away portion is in engagement with the side of the cut away portion and also contacts with the periphery of the roller 64 of the differentially movable frame 58 (Figs. 4 and 5). The roller 64 is provided with a convex periphery because it was found to be desirable from a mechanical standpoint to cause the long arm 62 of the U shaped member to move equal distances in order to index properly with the selected lever 65. With a roller having a squared periphery this would be impossible as the differences in the diameter of the coins are not relatively proportionate. Consequently the roller shown in the drawings was designed.

If a dime is being registered it will engage near the top of the upper beveled face of the roller 64 and rock the differentially movable frame to a position in which the long arm 62 of the U shaped member is in engagement with the notch in the dime's lever of the levers 65. If the next coin to be registered is a penny the differentially movable frame would not be moved a sufficient distance to come into contact with the penny lever 65 if the periphery of the roller was not beveled in the manner shown on account of the very small difference in the diameters of these coins. But when a penny comes into contact with the roller the differentially movable frame will be rocked slightly farther around its center due to the slightly larger diameter of the penny. This greater movement of the frame 65 will, owing to the beveled edge of the roller 64, cause the coin and roller to coöperate in the manner of a cam movement to increase the extent of movement of the frame beyond what it would be moved if the extent of its movement was determined only by the diameter of the penny. The movement therefore is seen to be the sum of the difference between the diameters of the dime and the penny and the difference between the diameter of the roller at the point at which it is engaged by the dime and that at which it is engaged by the penny.

The difference between the diameters of pennies and nickels is sufficient to cause the differentially movable frame to be positioned in alinement with the nickel lever 65 without any added movement being given it by the bevel on the roller 64. For that reason the nickel will force the roller to the right (Figs. 3 and 4) until the edge of the coin has passed over the highest point of the bevel of the roller 64 and engages the roller on its lower beveled face, this position of the nickel being relatively the same on the lower face as that of the penny on the upper face.

The difference between the diameter of the nickel and that of the quarter is too great to properly aline the differentially movable members with the quarter lever 65. The beveled edge of the roller 64 also takes care of this adjustment. When a quarter is being registered it will force the roller 64 to the right (Figs. 3 and 4) until the edge of the coin has passed the highest point on the beveled periphery of the roller and then allow the differentially movable frame to move back slightly toward the left as the quarter moves down the lower side of the beveled portion of the roller 64. This movement will therefore be the difference between the diameters of the nickel and quarter minus the difference between the diameter of the roller 64 at the point where the nickels and quarters respectively engage it. It can be seen from the above description that the use of the beveled periphery on roller 64 made possible a more nearly uniform movement of the differentially movable member to its different positions than would have been possible had the difference in diameter of the coins been the only means of controlling this movement.

This invention in its present embodiment is adapted to register pennies, nickels, dimes and quarters but it is evident that the machine could be made to register coins of higher denominations without departing from the spirit of the invention. In order to register the values of coins of the four denominations, above mentioned, there are provided four bell crank levers 65 pivoted on the shaft 69 (Figs. 1 and 4). The downwardly extending arms of these bell crank levers are forked at their lower ends, as shown in Fig. 1. The inside edges of the forked members 65 bear small laterally extending flanges to facilitate the alinement of the long arm 79 of the U shaped member with the forked ends of arm 65. As the differentially movable frame 58 is moved different distances by coins of different denominations the long arm of the U shaped member 62 carried by the frame 58 will engage in one or another of the forked ends of the levers 65, depending on the coin to be registered. The other arms of the bell crank levers 65 extend rearwardly from the shaft 69 and carry rollers 70 which project into four differently cut slots 77 in four corresponding arms 71. The arms 71 are fast on a sleeve 72 surrounding the main drive shaft 35. On the right hand end of the sleeve (Fig. 4) is a forwardly extending arm 73 carrying a segment gear 74 (Figs. 1 and 4).

The arms 71 at their upper ends have slots 76 concentric with shaft 35 to prevent interference with the rollers 70 on the arms 65 that are not actuated.

As shown in Fig. 1 the arms 65 are rocked selectively clockwise by an actuating mechanism, to be described later. When this actuation occurs it can be seen that on account of the differential arrangement of the cam slots 77 the arms 71 will be rocked counter-clockwise different distances, depending upon which of the arms 65 has been selected by the differentially movable frame under control of the ejected coin. Owing to the fact that the arms 71 are fast on the sleeve 72 to which is also fast the segment bearing arm 73 it is evident that this segment arm 73 will also be rocked counter-clockwise and the segment carried by this arm will thereby actuate the units wheel of the totalizer in a manner hereinafter described.

The mechanism for actuating the bell crank levers 65 will now be described. Depending from and fast on a shaft 78 are two arms 79 and 80 (Figs. 1 and 4). At their lower ends these arms carry a rod 81 which passes through a slot in a rearwardly extending portion of the long arm of the U shaped member 62, carried by the differentially movable frame. Also fast on the shaft 78 is an arm 82, which at its upper end is pivotally connected to a pitman 83. This pitman at its opposite end (Fig. 13) is forked to straddle the main drive shaft 35 and carries a roller 85 which coöperates with the race of a cam disk 86 fast on the shaft 35. It is evident from an examination of Fig. 13 that upon the operation of the machine the arm 82 and the shaft 78 will be rocked counter-clockwise (clockwise in Fig. 1) due to the conformation of the cam groove in cam 86. This movement of the arm 82 will rock the arms 79 and 80, carrying the rod 81, in a clockwise direction, as seen in Fig. 1. As the rod 81 passes through the slot in the arms 62 it is evident that movement of this yoke frame composed of the arms 79 and 80 and the rod 81 will rock the U shaped member 62 on its pivot 61 and as the upper end of the long arm of the U shaped member 62 has been placed in coöperative relation with the lower forked end of the downwardly extending arm of one of the bell crank levers 65 that lever will be rocked clockwise. The movement of the selected bell crank lever 65, as before stated, will cause the segment bearing arm 73 to be rocked counter-clockwise a number of steps depending on which one of the bell crank levers 65 has been selected for operation. As shown in Figs. 1 and 2 springs 87 attached to a rod 88 are provided to assist in the return of the bell crank levers 65 to normal position after the same have been operated.

A mechanism is provided to retain the segment bearing arm 73 in its normal elevated position when the machine is not operated. Pivoted on the shaft 44 is a downwardly extending arm 125 (Figs. 1 and 3) carrying a roller 126. The arm 73 carries a projection 127 the edge of which is concentric with the shaft 35. Near its upper end this projection has a depression therein in which the roller 126 on the arm 125 is normally seated thereby holding the arm 73 in its normal position. A coil spring 128 surrounding the shaft 44 keeps the roller in engagement with the projection 127. When the arm 73 is rocked as above described, the projection 127 is also rocked counter-clockwise (Fig. 1). This movement will cause the roller 126 to be forced out of the recess in the projection 127 against the action of the spring 128. The roller 126 engages with the edge of the projection and as the same is returned to normal position will again engage in the recess, thereby holding the arm 73 in normal position until the next operation of the machine.

Figure 3:
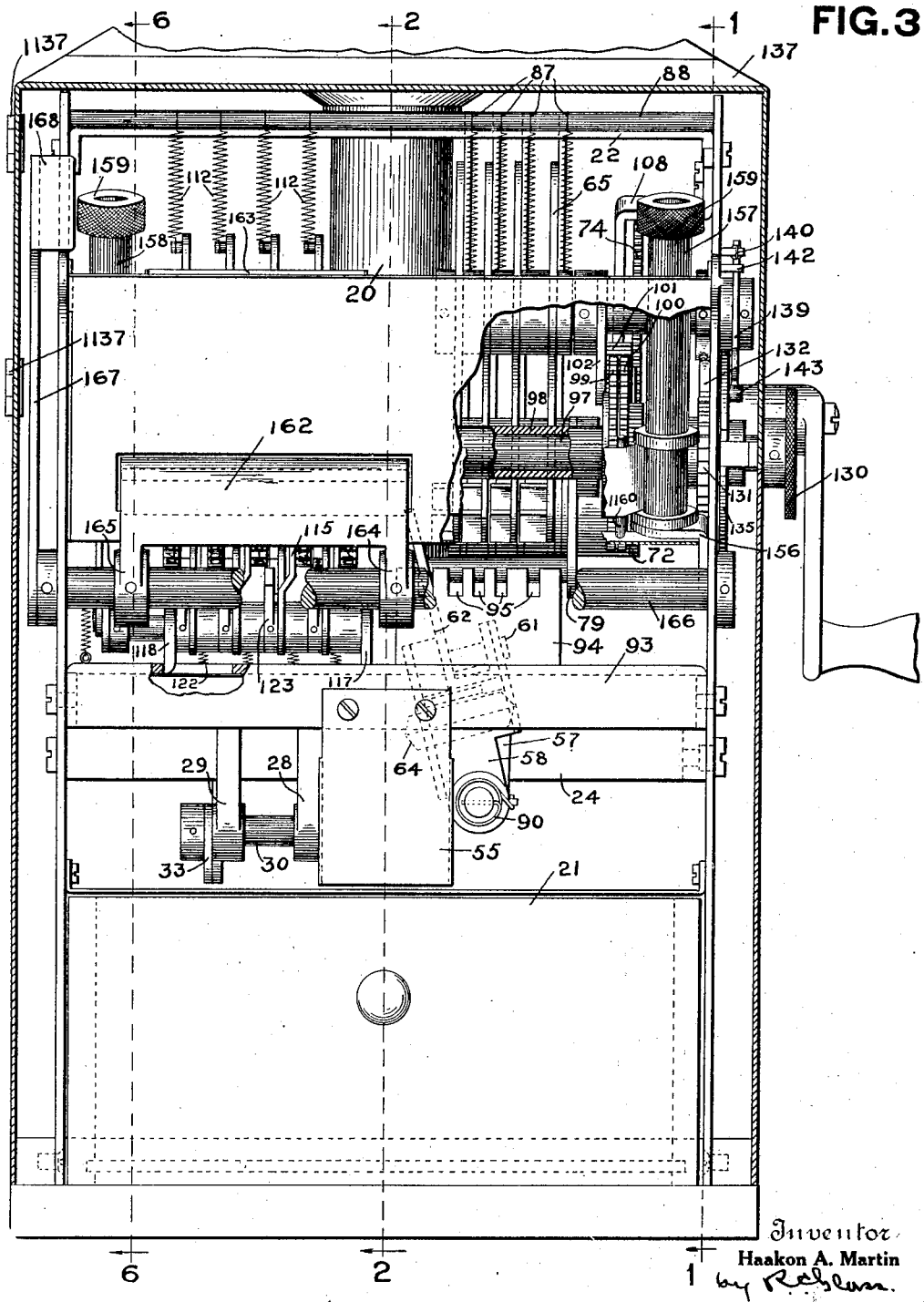
Fig. 3 is a front elevation of the machine with part of the mechanism broken away and cabinet removed to show more clearly the construction.

An alining mechanism is provided to aline the long arm of the U shaped member 62 with the forked lower end of the selected bell crank lever 65. This alining mechanism is clearly shown in Figs. 1 and 3 and consists of a plate 94 fast to the tie bar 93. This plate extends in an upward direction from the tie bar 93 and near its upper end is bent as shown. In this bent portion are cut notches 95 (Fig. 3). When the U shaped member 62 is rocked its long arm will engage in one of the notches 95 in the plate 94 and this engagement will thereby aline the member 62 with the arm of whichever bell crank lever 65 is selected for operation, and maintain this alinement during its entire operation.

The present invention has a totalizer which has a somewhat novel construction, having five totalizer wheels each divided into three sections, and each section bearing numerals from "1" to "9" and "0" inclusive. This construction was adopted because these totalizer wheels are also used for printing wheels and the enlargement of the diameter of the wheels makes the printing surface flatter and a better impression is obtainable therefrom. As there are three sets of numerals on the totalizer wheels there are also three points at which transfers are accomplished. Totalizer wheels 96 (Fig. 9) with the exception of the units wheel are rigidly mounted on hubs which are loose on a shaft 97. The units wheel is fast on a sleeve 98, surrounding the shaft 97. The opposite end of the sleeve 98 carries a gear 99 (Figs. 3 and 9). In juxtaposition to this gear is another gear 100 (Figs. 1 and 3) of the same diameter as gear 99 and to which is fast the pinion 75 with which the segment 74 meshes to actuate the totalizer.

Figure 6:
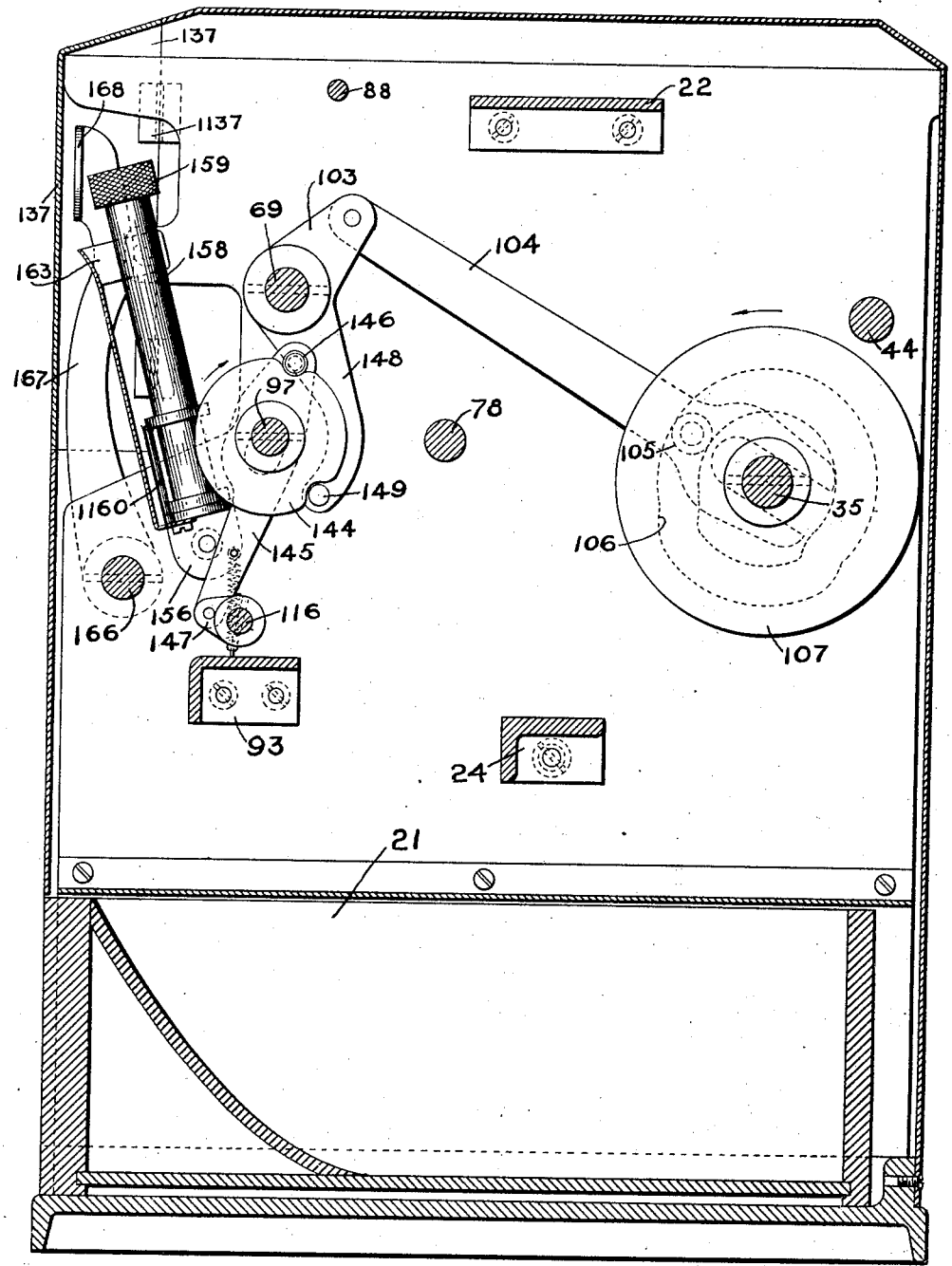
Fig. 6 is a transverse vertical section through the machine on the line 6—6 of Fig. 3.

In order to couple these two gears 99 and 100 together to transmit movement of the segment 74 to the totalizer there is provided a broad pinion 101, loosely mounted on the end of an arm 102, fast on the shaft 69. This pinion 101 is normally in engagement as shown in Fig. 1 with the gears 99 and 100 but means is provided to disengage this pinion from the gears at certain times during an operation of the machine. The mechanism for uncoupling this gear 101 consists of the arm 103 fast on shaft 69, and pivotally connected to one end of a pitman 104, the other end of which is forked to straddle the main drive shaft 35 (Fig. 6). This pitman carries a roller 105 engaging in a cam groove 106 of a cam disk 107, fast on shaft 35. This shaft is given one complete rotation at each operation of the machine and owing to the conformation of the cam groove 106 the arm 103 and therefore shaft 69 and pinion bearing arm 102 are rocked counter-clockwise (Figs. 1 and 6) to rock the coupling pinion 101 out of mesh with the gears 99 and 100. It is obvious from Fig. 1 that the coupling pinion must not be coupled to gears 99 and 100 during return movement to normal position of the segment 74 as this would tend to move the totalizer wheels in a reverse direction, which movement is prevented by retaining pawls which will be described presently. An alining device is provided to insure the correct meshing of the coupling pinion 101 with gears 99 and 100 when this pinion is operated to engage with said gears. The alining device consists of an L shaped bar 108 (Figs. 1 and 3), fastened at one end to the side frame of the machine and the other end being adapted to engage between the teeth of the pinion 101 when this pinion is uncoupled.

Each totalizer wheel has mounted fast thereon a ratchet wheel 109, the teeth of which are engaged by a retaining pawl 110, pivoted on the shaft 69. This pawl 110 is retained in engagement with the ratchet by the action of a spring 112, fastened to an oppositely extending projection of the pawl 110 and to rod 88. This pawl prevents a backward movement of the totalizer wheels 96.

A novel form of transfer mechanism is shown in the present invention. As pointed out above it is evident that as there are three sets of numerals on the totalizer wheels it is necessary to provide three points at which transfers are accomplished. Each totalizer wheel has fastened thereto a triangular member 113, the angles of which carry tripping lugs 114 (Fig. 10) adapted to engage with one arm 115 of a two armed lever, loosely mounted on a shaft 116, carried by arms 117 and 118, fastened to the tie bar 93. The other arm of this two armed lever carries a pawl 119, which is normally held in engagement with the ratchet wheel 109 of the wheel of next higher denomination (Fig. 2). It can therefore be seen that when one of the lugs 114, carried by the triangular member 113 comes into engagement with an arm 115, this arm will be rocked counter-clockwise about its pivot, as seen in Figs. 1 and 2, and clockwise, as seen in Fig. 10. This movement of the arm 115 causes corresponding movement of the arm 120 of the two armed lever and as the arm 120 carries the transfer pawl 119 the pawl will move the totalizer wheel of next higher denomination one step by its engagement with the ratchet wheel 109 of said totalizer element. The pawls 119 are held in engagement with the ratchet wheels 109 of next higher order by springs 121. Springs 122 are also provided to return the arm 120, carrying the transfer pawl 119, to normal position, after a transfer has been accomplished. Fast on the shaft 116 are overthrow preventing arms or stops 123, one for each transfer pawl. These stops are provided to prevent more than one step of movement being given to the element of next higher denomination at one transfer operation. As shown in Figs. 2 and 10 when a transfer pawl has been operated to move the totalizer wheel of next higher denomination one step the portion 170 of the pawl comes into engagement with the top of its corresponding overthrow preventing pawl. The tooth of the pawl 119 is also at this time in engagement with the ratchet wheel 109 and therefore it can be seen (Fig. 2) that further movement of transfer pawl 119 or ratchet wheel 109 is impossible as the transfer pawl would jam between the overthrow preventing pawl and the ratchet wheel 109.

It is desirable in machines of the type shown in the present invention to provide means for returning the totalizer to zero at any desired time, and the following is a description of the mechanism employed to accomplish this result. On the right hand end of the shaft 97 (Fig. 3) is a knurled knob 130 adapted to be rotated manually in order to turn the totalizer to zero. Just inside the right hand side frame of the machine (Figs. 1 and 3) the shaft 97 carries a ratchet wheel 131. Engaging with this ratchet wheel is a spring pressed pawl 132 to prevent turning the totalizer backward when it is to be turned to zero. The shaft 97 contains a groove 133 running the length of the totalizer. This groove has one side squared and spring pressed pawls 134, mounted on the triangular members 113 of each totalizer wheel, are adapted to engage in this groove, when all the totalizer wheels 96 stand in zero position. When the shaft 97 is rotated by the manual operation of the knob 130 the pawls 134 will engage in this groove 133 and turn the totalizer wheels to zero position from whatever position they occupy. On the right hand end of shaft 97 there is a disk 135 (Fig. 7) fast on said shaft. This disk has cut in its periphery a notch 136. A door 137 hinged at 1137 is cut in the casing of the machine adjacent the disk 135 and this door has fastened to its lower inside edge a short bar 138. This bar 138 normally engages in the notch 136 cut in the periphery of said disk and therefore the shaft can not be rotated while the door is closed. On the shaft 69 there is loosely pivoted a pawl 139. A spring 140 is fastened to an upwardly extending portion 141 of said pawl and tends to rock the pawl in a counter-clockwise direction. This movement, however, is limited by a pin 142 which is mounted in the side frame of the machine. The disk 135 carries a projecting pin 143 which is adapted to engage with a projecting surface of pawl 139, and prevent the rotation of the disk. When a turn-to-zero operation is to be accomplished it is necessary first to open the door 137 and then manually raise the pawl 139 a sufficient distance to allow the pin 143 on the disk 139 to pass. The pawl is then released after the rotation of the shaft 97 has been begun. When the shaft has completed one rotation the pin 143 on disk 135 will contact with pawl 139 and thereby stop the movement of said disk. Then when the door is again closed the bar 138 will enter the notch 136 in the disk 135 and thereby lock the shaft 97 against further rotation.

Means are provided for moving the overthrow arms 123, for the transfer mechanism, out of operative position during turn-to-zero operations, for it is evident that if they were not so moved they and the transfer pawls would jam with the teeth of the ratchet wheels 109 thereby tying up the machine. The shaft 97 near its left hand end carries a cam 144 (Fig. 6) the periphery of which contains two depressions. A pitman 145 is slotted in its central portion to surround the shaft 97 and at its upper end carries a roller 146 which is in engagement with one of the depressions in the periphery of cam 144. At its lower end this pitman is pivoted to an arm 147, which is fast on the shaft 116, on which shaft the overthrow arms 123 are fast. It is apparent therefore from Fig. 6 that when the cam 144 is rotated the pitman 145 will be elevated and will rock the shaft 116 and overthrow pawls 123 in a clockwise direction. This movement will rock these pawls out of operative relation with the transfer pawls 119 and therefore prevent the above mentioned jamming.

It is evident that the coupling pinion 101 must not be in engagement with gears 99 and 100 during turn-to-zero operations. A mechanism is therefore provided to prevent turn-to-zero operations of the shaft 97 when this coupler gear 101 is in engagement with gears 99 and 100. This mechanism consists of the curved arm 148, which is an extension of arm 103 fast on shaft 69. This arm at its lower end carries a pin 149, which is normally in engagement with one of the recesses in the periphery of cam 144, and when the pin 149 on arm 148 is in this recess the cam 144 and therefore the shaft 97 is locked against rotation and no turn to zero action can be started. It will be remembered that the shaft 69 also carries the arm 102 on which the coupling pinion 101 is mounted and therefore when this shaft is rocked in a counter-clockwise direction (Fig. 6), as before described, the curved arm 148 carrying pin 149 will also be rocked counter-clockwise and release the cam 144 and shaft 97 and thereby permit a turn to zero operation.

Figure 7:
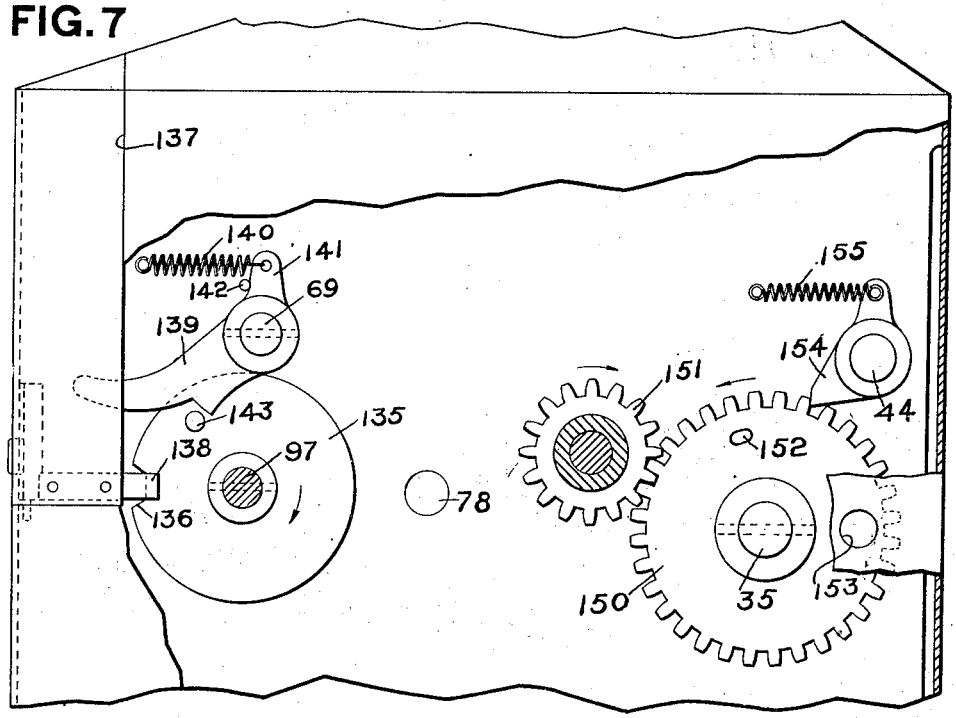
Fig. 7 is a side elevation of the machine with part of the cabinet broken away to show the mechanism for manually releasing the turn to zero mechanism for operation as well as the means for indicating at what position of the parts turn to zero operations can be made.

Mounted on the extreme right hand end of the shaft 35 is a gear 150. This gear 150 meshes with a pinion 151, fast on the hub of the crank handle. On the side of this gear is a suitable mark 152, which, when it can be seen through an opening 153, cut in the casing of the machine, indicates to the operator that the parts are in such position that the coupling pinion 101 has been disengaged from the gears 99 and 100 and the turn to zero shaft 97 unlocked so that a turn-to-zero operation can be accomplished. A pawl 154, which is pivoted on shaft 44 and engages with the teeth of gear 150, is provided to prevent backward rotation of the gear 150. This pawl is maintained in engagement with the gear by a spring 155, (Fig. 7).

The machine of the present invention is adapted to print the total standing on the totalizer on an inserted card at any desired time. Mounted on the member 156, at each side of the machine, are long manually operated spools 157 and 158 on the lower part of which an ink ribbon is wound. The tops of these spools carry knurled heads 159, as shown in Figs. 1, 2 and 3, to facilitate the winding of the ribbon from one spool to the other. The upper part of each spool is hollow and contains a coiled friction spring 160, surrounding a rod 161, which runs the length of the spool. This spring presses against the bottom of the hollow portion of the spool and against a screw at the top of rod 161 and is for the purpose of keeping constant tension on the ink ribbon. The ribbon extends about pins 1160 across the face of the totalizer wheels which it will be remembered are also the printing wheels. The present embodiment is adapted to print on a card but it is evident that any suitable form of record material may be used. The card to be printed on is inserted in a chute 163 (Figs. 1, 2, 3 and 6). This chute is fast at the bottom on the members 156 and at the top is fastened to the side frames of the machine. The back plate of the chute 163 extends the width of the machine and forms a shield for the totalizer and other mechanism. An opening is cut to allow a broad impression hammer 162, which carries a strip of rubber or other resilient material, when operated, to press the inserted card against the totalizer and take an impression therefrom. This hammer 162 is carried by arms 164 and 165, fast on a shaft 166, which is mounted in the side frames of the machine. On the left hand end of this shaft (Fig. 2) is an upwardly extending arm 167, which at its upper end carries a small flanged finger plate 168. This arm is adapted to be given a manual operation in a clockwise direction (Figs. 1, 2 and 6) and this operation will rock the shaft 166 and therefore the hammer 162, this hammer striking the card and pressing it against the type wheels whereby the card receives an impression through the medium of the ink ribbon.

The operation of the machine in the present invention is as follows. Coins are deposited in the coin receptacle, formed by the cylindrical portion 13 and the platform 14. The operator then turns the thumb lever 19, which through shafts 15 and 16 and segments 17 and 18 rocks the section of the platform 14 and allows the coins to fall into the coin tube 20, beneath said coin receptacle. The coins may be retained in this coin tube 20 until such time as the operator can register them.

When it is desired to register these coins the crank handle (shown in Figs. 3 and 4) is operated. The movement of the crank handle is transferred to the shaft 35, which is the main drive shaft, by means of pinion 151 and gear 150. A pitman 34 is actuated by a cam 37 to operate the coin plunger 25. This plunger is given a quick upward and downward movement in the coin tube to cause any coins not lying in a horizontal position to take such a position.

The bottom coin in the coin tube rests on the table formed by cross bar 24 and is in the path of movement of the coin slide 39, which has a horizontal movement beneath the coin tube and upon the table 23. As the coin slide passes beneath the coin tube it comes in contact with the bottom coin in the tube and pushes this coin ahead of it. As this coin emerges from the coin tube it comes in contact with the periphery of the roller 64, which is supported by the rock frame 58. Owing to the fact that the opposite edge of the coin abuts a stationary flange on the table 24, when the coin is pushed out of the coin tube, it rocks the rock frame 58 different distances depending on the diameter of the coin. The rock frame 58 has an upwardly extending arm 62. When this arm is rocked with the rock frame 58 its upper end comes into engagement with one or another of the lower forked ends of a series of arms of bell crank levers 65, which are pivoted on the shaft 69. The other arms of these bell crank levers extend rearwardly and carry rollers 70, engaging in cam grooves cut in corresponding levers 71. The arm 62 of the rock frame is slotted and through this slot runs a rod 81, which is carried by two depending arms 79 and 80, fast on the shaft 78. These arms and the rod 81 carried thereby are adapted to be given a clockwise movement by a cam and pitman, above described, and when this movement occurs the rod will carry the arm 62 with it. As the upper end of this arm is in engagement with the lower forked end of the depending arm of a bell crank lever 65, corresponding to the coin being registered, the selected lever 65 will be given a clockwise movement which will in turn rock the levers 71 counter-clockwise through the engagement of roller 70 of the selected lever with cam slot 77 in one of these levers 71. The levers 71 it will be remembered are fast on a drum or hub 72 on the right hand end of which is an arm 73, which at its opposite end carries a segment gear 74. This segment gear meshes with the pinion 75, which is fast to gear 99 and which by means of this gear 100 connected by pinion 101 actuates the totalizer. It can be seen therefore that when the levers 71 are given a counter-clockwise movement, as shown in Fig. 1, the segment carrying lever 73 is also given as many steps of counter-clockwise movement as there are units of value in the coin being registered. This movement will therefore through the above described connections rotate the totalizer wheels an extent corresponding to the value of the coin being registered.

When the coin slide pushes a coin into contact with the roller 64, in the rock frame 58, the coin remains in such contact until near the end of the rotation of shaft 35 when the coin slide will be given a further movement to position this coin out of engagement with the roller 64. This movement will push the coin over the edge of the supporting table 24 and it will fall into a locked compartment located in the base of the machine.

If it is desired to print the total on the totalizer wheels a card is inserted in the chute 163 and the lever 167 is given a clockwise movement (Fig. 1). This movement will throw the printing hammer 164 against the back of the inserted card and press the same against the type wheels, whereby an impression will be taken on the card through the ink ribbon.

To reset the totalizer to zero it is necessary to turn the crank handle until the mark 152 on gear 150 comes under the opening 153 in the casing of the machine. Then the door 137 in the casing is opened, this movement removing the bar 136 from the notch in the disk 135 and thereby unlocking the shaft 97. The pawl 139 must then be raised manually in order to allow sufficient room for the pin 143 to pass the extension on the pawl. A knurled knob on the right hand end of the shaft 97 is then rotated in a clockwise direction (Fig. 7) and as the shaft revolves a groove cut in this shaft will pick up the totalizer wheels by means of the engagement of pawls 134 on said wheels in the groove and return all of the wheels to zero position. The wheels will be stopped in zero position by the engagement of the pin 143 on disk 135 with the projection on pawl 139. The door 137 in the casing is then closed, which movement causes the bar 136 to again engage in the notch in disk 135 and thereby aline the totalizer wheels in zero position and lock the shaft 97 against rotation.

While the form of mechanism herein shown and described is admirably adapted to fulfil the objects primarily stated, it is to be understood that it is not intended to confine the invention to the one form of embodiment herein disclosed, for it is susceptible of embodiment in various forms all coming within the scope of the claims which follow.

What is claimed is:—

1. In a machine of the class described, the combination with a differentially movable selecting member, of an element coöperating therewith and carrying coin engaging means constructed to compensate for the arbitrary differences between the diameters of the coins, and actuating devices constructed to be engaged by the selecting member.

2. In a coin handling machine having a passage way for coins of different values, the diameters of the coins of each value differing arbitrarily from the diameters of the coins of the other values, a member pivoted for movement in a plane at an angle to the coin passage way and carrying a coin engaging roller constructed to compensate for the arbitrary differences between the diameters of the coins.

3. In a coin handling machine, the combination with a differentially movable member, of a roller coöperating with passing coins to effect differential movement of the member, the coin engaging surface of the roller being shaped to cause movement of the member to extents controlled jointly by the diameters of the coins and the face of the roller engaged by the coins.

4. In a coin handling machine, the combination with a differentially movable member, of a roller coöperating with passing coins to effect differential movement of the member, said roller having its periphery beveled to cause movement of the member to extents determined jointly by the diameters of the coins and the portion of the beveled periphery engaged by the coins.

5. In a coin handling machine, the combination with a coin ejector for ejecting coins of different diameters, of a pivoted member differentially movable in a plane at an angle to the path of movement of the coins, and an element carried by said member and having a coin engaging surface constructed to cause the member to move extents determined jointly by the diameters of the coins and the portion of the element engaged by the coins.

6. In a coin handling machine, the combination with a coin ejector for ejecting coins of different diameters, the differences in diameters being arbitrary, of a member differentially movable in a plane at an angle to the path of movement of the coins, and a coin engaging roller carried by said member and having its coin engaging surface beveled to cause the member to move extents determined jointly by the diameters of the coins and the portion of the roller engaged by the coins.

7. In a machine of the class described, the combination with a coin receptacle, of a tube mounted beneath said coin receptacle, means for permitting the coins to drop from the coin receptacle into said tube, means for ejecting the coins singly from the bottom of said tube, operating means therefor, a totalizer, actuating means therefor, a differentially movable frame carrying a compensating roller adapted to engage the periphery of the ejected coin whereby said frame is moved different distances to predetermine the value to be added on said totalizer when said actuating means is operated.

8. In a machine of the class described, the combination with a coin receptacle, of a tube mounted beneath said coin receptacle, means for permitting the coins in the coin receptacle to drop into said tube, means for ejecting the coins singly from the bottom of the coin tube, a pivoted frame laterally movable to different extents, a compensating roller carried by said frame, the former by its engagement with the periphery of said ejected coin positioning the latter, totalizer elements, and actuating means for operating the totalizer elements extents corresponding to the extents predetermined by the movement given the movable frame by the ejected coin.

9. In a machine of the class described, the combination with a coin receptacle, of a tube mounted beneath said receptacle, means for permitting the coins deposited in said coin receptacle to drop into said tube, a table positioned under said tube on which the bottom coin in the tube rests, a differentially movable frame carrying a roller having a graduated periphery, and means for moving said bottom coin on said table so that one edge of said coin will engage the periphery of said roller thereby positioning said frame to one of its differential positions.

10. In a machine of the class described, the combination with a totalizer, of a differentially operable actuator therefor, a plurality of sets of devices, each set constructed to operate the actuator to a different extent, an invariably moved driving mechanism, a coin ejector, and a member for selectively connecting the sets of operating devices and the driving mechanism, said connecting mechanism controlled jointly by the diameters of the ejected coins and the portion of the member engaged by the said coins.

11. In a machine of the class described, the combination with a totalizer, of an auxiliary actuating segment therefor, a plurality of sets of devices, each set constructed to oscillate said segment a different extent, an invariable moved driving mechanism, a coin ejector, and a member for selectively connecting the sets of devices and the driving mechanism, said member controlled jointly by the diameter of the ejected coin and the relative position occupied by the member with respect to the coin.

12. In a machine of the class described, the combination with a totalizer, of a differentially movable operating element for the totalizer, a plurality of cams rigid with the operating member each cam being constructed to represent an amount different from the others, and coin controlled means for selectively actuating the cams and thereby differentially operating the totalizer element.

13. In a machine of the class described, the combination with a totalizer, of a member for differentially operating the totalizer, a plurality of cams rigid with said member and each constructed to represent a different amount, elements each having the same extent of movement when operated and each coöperating with a different one of the cam portions, and coin controlled means for selectively operating said elements whereby to differentially operate the different members.

14. In a machine of the class described, the combination with a totalizer, of an oscillatory segment for actuating same, a plurality of arms rigid with said segment and each having a cam portion constructed to represent an amount different from the others, bell cranks each constructed to have the same extent of movement when operated and each coöperating with a different one of the cam portions, and coin controlled means for selectively operating the bell cranks and thereby differentially oscillating the aforesaid actuating segment.

15. In a machine of the class described, the combination with a totalizer, of an oscillatory operating segment therefor, a plurality of arms rigid with said segment, said arms each having a cam slot and the cam slots each being constructed to represent a different amount, members having rollers coöperating with the cam slots and each constructed to move the same distance when operated, and coin controlled means for selectively and positively operating said members whereby to differentially and positively oscillate the aforesaid totalizer operating segment.

16. In a machine of the class described, the combination with a differentially movable selecting member, of a roller carried by said member adapted to coöperate with the peripheries of inserted coins, the said selecting member being moved to its various positions by the movement of the coins past said roller, and means on said roller for automatically compensating for the unequal differences between the diameters of the coins handled.

17. In a machine of the class described, the combination with a differentially movable selecting member, of a roller carried by said member having a convex beveled edge adapted to coöperate with the peripheries of inserted coins, actuating devices spaced equal distances apart, and means whereby the differentially movable selecting means is moved to select an actuating device for operation, the unequal differences in the diameters of the coins being compensated for by the beveled periphery of the said roller.

18. In a machine of the class described, the combination of a plurality of totalizer control members having dissimilar extents of actuation, a totalizer actuator moved by said control members, a selecting member and an element coöperating therewith and acted upon by the various coins, said element being so constructed that the selecting member is always moved in predetermined length steps of substantially the same length for each coin for selecting an actuator commensurate with the value of the different coins as they proceed through the machine.

19. In a machine of the class described, the combination with a differentially movable selecting member, of an element carried by said member having a convex edge adapted to coöperate with inserted coins, and actuating devices spaced equal distances apart and constructed to be engaged by the selecting member, the convex edge of the roller coöperating with the different coins to compensate for the arbitrary differences in the diameters of the coins.

20. In a machine of the class described, the combination with a coin receptacle, of a tube mounted beneath said coin receptacle, means for permitting the coins in the coin receptacle to drop into said tube, means for ejecting the coins singly from the bottom of the coin tube, a pivoted frame laterally movable to different extents, a compensating element carried by said frame, the latter by engagement with the periphery of said ejected coin positioning the former, totalizing elements, and actuating means for operating the totalizer elements extents corresponding to the extent predetermined by the movement given the movable frame by the ejected coin.

21. In a coin handling machine having a passage way for coins of different values, the diameters of the coins of each value differing arbitrarily from the diameters of the coins of the other values, a member pivoted for movement in a plane at an angle to the coin passage way carrying coin engaging means constructed to compensate for the arbitrary differences between the diameters of the coins, and a plurality of actuating devices constructed to be selectively engaged by the said pivoted coin controlled member.

22. In a machine of the class described, the combination with a coin receptacle, of a tube mounted beneath said coin receptacle, means for permitting the coins to drop from the coin receptacle into said tube, means for ejecting the coins singly from the bottom of said tube, operating means therefore, a totalizer, actuating means therefore, a differentially movable frame carrying a compensating roller engaging the periphery of successive coins of assorted amounts which by reason of its contour and position controls the movement of the frame to substantially uniform extent regardless of the non-uniform difference in diameters of succeeding coins.

23. In a machine of the class described, in combination, a plurality of totalizer controllers, a differentially movable selecting member, an element coöperating therewith, said element being constructed to compensate for the difference between the diameters of the coins and thus the variable selecting member is always moved in steps of predetermined length for selecting a controller commensurate with the value of the coins acting upon said element.

24. In a machine of the class described, a totalizer, an actuator member therefor, a control member therefor, a coin guided and power actuated selector member, said members entering the value of the coin guiding said selector member in said totalizer.

25. In a machine of the class described, a totalizer and an operative member therefor coin controlled in its motion in one plane and power actuated in its motion in another plane, and connecting means between said totalizer and said operative member.

26. In a machine of the class described, a totalizer, an actuator therefor, control means for said actuator comprising means for latching said actuator when said totalizer is at zero position and releasing said actuator when same is moved and returned to latching position at the termination of the actuation of said totalizer.

27. In a machine of the class described in combination, coin actuated selecting means, a totalizer, actuating means therefor, control means for said actuating means, said selecting means being movable to the proximity of one of said control means, power driven means moving said selector and thus actuating said control means following upon movement of the control selector as such.

28. In a machine of the class described, a totalizer, actuating means therefor, control means for said actuating means, selection means for denoting the totalizer control means, power means transmitting power to said selection means, coin control means for said selection means moving it to selecting position after which power is transmitted thereto.

29. In a machine of the class described, a totalizer, an actuator therefor, a flexibly controlled latching member maintaining said acuator at zero position of said totalizer, a notch upon said actuator receiving said latch from which said latch moves and to which it returns upon completion of motion of said actuator whereupon by reason of said spring control the latch forces the actuator to zero position and temporarily maintains it there.

30. In a machine of the class described, in combination, a totalizer, actuating mechanism comprising a fast and loose pinion, a broad pinion engaging both of said pinions and a turn to zero mechanism connected to and actuating said totalizer, a member on the shaft on which said totalizer is mounted, a locking arm on said shaft on which said broad pinion is oscillated, said arm and member being in locked relation when said broad pinion is in operative position and means for releasing said member only when said broad pinion is moved out of operative position.

31. In a machine of the class described, a receptacle for coins, means for moving them therefrom, measuring means interposed in the path of said coins, selective means connected to said measuring means, alining means therefor, actuating means for said selective means, a totalizer, actuating means therefor, comprising a series of variably movable members, connecting means between said totalizer and said variably movable members, connecting means between the above selective means and said series of variably movable members actuated thereby thus enabling the transmission to the totalizer of the movement of the measuring means.

32. In a machine of the class described, a collective totalizer, actuating means therefor, coin controlled selective means, power means moving said selective means thereby directing said actuating means, a coin receptacle and means for moving coins therefrom and thereby positioning said selective means by said coins.

33. In a machine of the class described, a collective totalizer actuating means therefor and means actuated by a coin selecting the actuating means for said totalizer and thereby entering in said totalizer succeeding values of each coin.

34. In a machine of the class described, a totalizer for a plurality of coins, variably movable members, a coin gaging member, connections between said variably movable members and said coin gaging member whereby said totalizer has entered therein the equivalent of the coin gaged by said coin gaging member.

35. In a machine of the class described in combination, a totalizer actuating mechanism therefor comprising a fast and loose pinion, a broad pinion engaging both of said pinions, a turn to zero mechanism connected to and actuating said totalizer, a member on the shaft on which said totalizer is mounted, a locking arm on said shaft on which said broad pinion is oscillated, said arm and member being in locked relation when said broad pinion is in operative position, a connection between said locking arm and the shaft supplying power to said arm, indicator means on said last-named shaft and means for bringing said indicator means to the notice of the operator, said locking arm and said coöperative member being in locked relation when said broad pinion is in operative position and means for releasing said coöperative member only when said broad pinion is moved out of operative position, at which time said indicator shows that a turn to zero operation may be proceeded with.

In testimony whereof I affix my signature.

HAAKON A. MARTIN.